United States Patent
Michael et al.

(10) Patent No.: US 12,083,854 B2
(45) Date of Patent: Sep. 10, 2024

(54) AIR-CONDITIONING ARRANGEMENT FOR A VEHICLE, AND VEHICLE

(71) Applicant: Audi AG, Ingolstadt (DE)

(72) Inventors: Jörg Michael, Ingolstadt (DE); Bastian Guyot, Gaimersheim (DE); Sebastian Albl, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 434 days.

(21) Appl. No.: 17/440,624

(22) PCT Filed: Mar. 9, 2020

(86) PCT No.: PCT/EP2020/056151
§ 371 (c)(1),
(2) Date: Apr. 15, 2022

(87) PCT Pub. No.: WO2020/207678
PCT Pub. Date: Oct. 15, 2020

(65) Prior Publication Data
US 2022/0258560 A1  Aug. 18, 2022

(30) Foreign Application Priority Data

Apr. 8, 2019 (DE) ...................... 10 2019 204 958.3

(51) Int. Cl.
*B60H 1/32* (2006.01)
*B60H 1/00* (2006.01)
(Continued)

(52) U.S. Cl.
CPC ..... *B60H 1/00285* (2013.01); *B60H 1/00371* (2013.01); *B60N 2/5628* (2013.01); *B60H 2001/003* (2013.01); *B61D 33/0078* (2013.01)

(58) Field of Classification Search
CPC ............ B60H 1/00285; B60H 1/00371; B60H 2001/003; B60N 2/5628; B61D 33/078
(Continued)

(56) References Cited

U.S. PATENT DOCUMENTS 1,750,873 A  3/1930 Buck et al.
6,478,369 B1 11/2002 Aoki et al.
(Continued)

FOREIGN PATENT DOCUMENTS

CN        205401756 U  *  7/2016
DE     602004003298 T2     6/2007
(Continued)

OTHER PUBLICATIONS

International Search Report and Written Opinion of the International Searching Authority directed to related International Patent Application No. PCT/EP2020/056151, mailed Jun. 4, 2020, with attached English-language translation; 14 pages.
(Continued)

*Primary Examiner* — Davis D Hwu
(74) *Attorney, Agent, or Firm* — Sterne, Kessler, Goldstein & Fox P.L.L.C.

(57) ABSTRACT

The present disclosure relates to an air-conditioning arrangement for a vehicle. The air-conditioning arrangement includes at least one fluid channel, which has at least two identically designed connection devices. The air-conditioning arrangement includes at least one movable vehicle seat. The present disclosure also relates to a corresponding vehicle having such an air-conditioning arrangement. The at least one vehicle seat includes an air-conditioning component that outputs a temperature-controlled airflow from the vehicle seat. The air-conditioning component can be removably connected to the connection devices of the at least one fluid channel via a movable fluid connection to establish fluid communication between the air-conditioning component and the fluid channel.

11 Claims, 1 Drawing Sheet

(51) Int. Cl.
  *B60N 2/56* (2006.01)
  *B61D 33/00* (2006.01)
(58) Field of Classification Search
  USPC .......................................................... 62/244
  See application file for complete search history.

(56) References Cited

U.S. PATENT DOCUMENTS

| | | |
|---|---|---|
| 10,023,084 B2 | 7/2018 | Wolas |
| 2008/0053126 A1 | 3/2008 | Ebigt et al. |
| 2018/0339609 A1* | 11/2018 | Taniguchi ............ B60N 2/0818 |

FOREIGN PATENT DOCUMENTS

| | | |
|---|---|---|
| DE | 102006041030 A1 | 3/2008 |
| DE | 102007042055 A1 | 3/2009 |
| DE | 102015210624 A1 | 12/2016 |
| DE | 102016112991 A1 | 1/2017 |
| EP | 1527913 A2 | 5/2005 |
| JP | 2004185268 A * | 7/2004 |

OTHER PUBLICATIONS

International Preliminary Report on Patentability directed to related International Patent Application No. PCT/EP2020/056151, completed Nov. 18, 2020, with attached English-language translation; 10 pages.

* cited by examiner

AIR-CONDITIONING ARRANGEMENT FOR A VEHICLE, AND VEHICLE

TECHNICAL FIELD

The present disclosure relates to an air-conditioning arrangement for a vehicle. The present disclosure also relates to a vehicle comprising such an air-conditioning arrangement.

BACKGROUND

Air-conditioning arrangements for vehicles are known in numerous variations. Today's vehicles are divided into three or four air-conditioning zones, which are supplied with temperature-controlled air by the ventilation device. As a rule, such ventilation devices comprise at least one air channel arranged in an instrument panel, with which at least one air vent is fluidically connected. In vehicles with autonomous or semi-autonomous driving functions, the vehicle seats can be adjusted very far back, in particular in the front region. As a result, an efficient flow and temperature control of the occupants on these vehicle seats is difficult by airflows which flow out of air vents arranged on the instrument panel. In particular in the case where the occupants have adjusted the vehicle seats to a comfort position.

A system for supplying conditioned air to a vehicle seat is known from DE 10 2016 112 991 A1, which system comprises a source for producing and/or supplying conditioned air and a static support structure. The vehicle seat is fastened to the static support structure. The vehicle seat comprises an outer surface and an air distribution chamber which are in fluidic connection with one another. A seat adjuster is arranged between the seat and the static support structure and creates an operative connection therebetween. By means of the seat adjuster, the seat can be moved into a plurality of positions. An adjustable channel comprises a fixed channel portion and a movable channel portion, the movable channel portion being movable relative to the fixed channel portion when the seat is moved between the plurality of positions. The adjustable channel transfers the air from the source to the air distribution chamber for producing the conditioned air.

DE 10 2007 042 055 A1 discloses a connecting device for connecting two air channels, the position of which can be changed relative to one another, the connecting device allowing a change of the position of the air channels relative to one another in two parallel planes and a connecting channel being provided between the two air channels, which at least has a first region, which provides a rotational movement of two adjacent and mutually sealed regions relative to one another, and at least one second region formed separately from the first region, which provides a translational movement of two adjacent and mutually sealed regions relative to one another.

DE 2006 041 030 A1 discloses an air conditioning system for an aircraft cabin, which system comprises at least one heat exchanger to which coolant and air circulating in a cooling circuit of a cooling system are supplied. The coolant cools the air supplied in the heat exchanger, and the air exiting the heat exchanger enters the aircraft cabin. The coolant of the cooling system is always in the liquid state in the cooling circuit. The liquid coolant can also cool an aircraft seat or a seat region of the aircraft seat.

A vehicle having a ventilation system is known from U.S. Pat. No. 1,750,873 A, which comprises fluid channels arranged in an underfloor of the vehicle.

DE 10 2015 210 624 A1 discloses a rail vehicle having a generic air-conditioning arrangement. The air-conditioning arrangement comprises at least one fluid channel, which has at least two identically designed connection devices, and at least one movable vehicle seat, wherein an air-conditioning component for producing a temperature-controlled airflow that can be output is arranged in the at least one vehicle seat. The air-conditioning component of the at least one vehicle seat can be optionally coupled to and uncoupled from one of the connection devices of the at least one fluid channel via a movable fluid connection, which, in order to establish a fluid-tight connection, is designed as a counterpart to the connection devices of the at least one fluid channel.

SUMMARY OF INVENTION

The present disclosure is based on the object of providing an air-conditioning arrangement for a vehicle and a vehicle having such an air-conditioning arrangement which allows an efficient flow and temperature control of an occupant regardless of a position of a corresponding vehicle seat.

This object is achieved by an air-conditioning arrangement for a vehicle with the features of the independent claims. Advantageous configurations with expedient further developments of the invention are specified in the dependent claims.

In order to provide an air-conditioning arrangement for a vehicle which allows an efficient flow and temperature control of an occupant regardless of a position of a corresponding vehicle seat, at least one fluid channel, which has at least two identically designed connection devices, and at least one movable vehicle seat, in which an air-conditioning component for producing a temperature-controlled airflow that can be output, is arranged. In this case, the air-conditioning component of the at least one vehicle seat can be optionally coupled to and uncoupled from one of the connection devices of the at least one fluid channel via a movable fluid connection, which, in order to establish a fluid-tight connection, is designed as a counterpart to the connection devices of the at least one fluid channel. In this case, the fluid connection is adjustable between a working position in which the fluid connection is inserted into one of the connection devices and is connected thereto in a fluid-tight manner, and an idle position in which the fluid connection is retracted in the direction of the vehicle seat.

In addition, a vehicle having such an air-conditioning arrangement is proposed. The at least one vehicle seat is movable in the vehicle longitudinal direction between at least two positions, wherein a connection device is arranged in each case at the at least two positions of the at least one fluid channel, to which the air-conditioning component of the at least one vehicle seat can be connected in a fluid-tight manner via the fluid connection.

As a result, the air-conditioning arrangement according to embodiments of the invention provide a seat-specific air-conditioning zone on the individual vehicle seats, which allows an efficient flow and temperature control of the occupant on the vehicle seat regardless of the current position of the vehicle seat.

For example, during a driver-controlled mode of operation of the vehicle, the vehicle seat can be arranged in a first position in the vehicle interior in which the driver can comfortably operate the steering wheel and operating elements in the region of an instrument panel. In this case, the air-conditioning component is connected in a fluid-tight manner via the fluid connection to a first connection device which is arranged at the first position of the vehicle seat on the fluid channel. If the vehicle seat is to be moved into a comfort position for autonomous or semi-autonomous driving, the fluid connection is first uncoupled from the first connection device and then the vehicle seat is moved from the first position to a second position (comfort position) in the vehicle interior, at which a second connection device is arranged on the fluid channel. The air-conditioning component is then connected in a fluid-tight manner to the second connection device of the fluid channel or connected to the fluid channel via the fluid connection.

According to an embodiment of the air-conditioning arrangement, the at least two connection devices can each have a shut-off valve which is open when a fluid connection is inserted and is otherwise closed. This can prevent a fluid flowing in the fluid channel from escaping into the corresponding connection device when it is not in use.

According to an embodiment of the air-conditioning arrangement, the at least one fluid channel can be arranged in the underfloor of the vehicle. This allows simple and invisible guidance of the fluid channel. Alternatively, the at least one length-adjustable air channel can be arranged in the sill region or in the center tunnel.

According to an embodiment of the air-conditioning arrangement, the connection devices of the at least one fluid channel can be arranged on the at least one fluid channel distributed in the vehicle longitudinal direction. As a result, a plurality of different positions can be specified for the individual vehicle seats, at which the air-conditioning component of the respective vehicle seat can be connected to the at least one fluid channel.

According to an embodiment of the air-conditioning arrangement, the at least one fluid channel can be designed, for example, as an air channel and the air-conditioning component can be designed as a fan. In this embodiment, the air-conditioning arrangement comprises a central air conditioner. For this purpose, the air conditioner can have, for example, a heater for heating and drying the airflow and an evaporator for cooling the airflow, which the fan in the vehicle seat sucks in and discharges via appropriate air vents for the flow and temperature control of the occupant on the vehicle seat.

Alternatively, the at least one fluid channel can be designed as a refrigerant line and the air-conditioning component is designed as an air conditioner. Such a decentralized air conditioner in the vehicle seat can have a heating element for heating and drying the airflow and an evaporator for cooling the airflow and a fan for generating the airflow. In this case, the evaporator of the air conditioner is connected to the refrigerant line via the fluid connection. The use of decentralized air conditioner units in the individual vehicle seats means that there is no need for a central air conditioner in the region of the instrument panel.

According to an embodiment of the air-conditioning arrangement, the fluid connection of the air conditioner can have a shut-off valve which is opened and otherwise closed when the fluid connection is inserted into the corresponding connection device. This can prevent refrigerant from escaping from the evaporator via the fluid connection when it is not in use.

According to an embodiment of the air-conditioning arrangement, the shut-off valves used can each be automatically opened by inserting the fluid connection into the corresponding connection device and automatically locked again after the fluid connection has been removed. Alternatively, the shut-off valves can be opened by manual actuation after the fluid connection has been inserted into the corresponding connection device and locked before the fluid connection is pulled out of the corresponding connection device.

The advantages described for the air-conditioning arrangement according to embodiments the invention for a vehicle also apply to the vehicle according to embodiments the invention.

The features and feature combinations mentioned above in the description, as well as the features and feature combinations mentioned below in the description of the figures and/or shown only in the figures, can be used not only in the respectively specified combination but also in other combinations or in isolation without getting out of the scope of the invention. Embodiments of the invention, which are not explicitly shown or explained in the figures but derive therefrom and can be produced by separated combinations of features from the embodiments explained, are thus to be regarded as included and disclosed.

BRIEF DESCRIPTION OF THE FIGURES

Embodiments of the invention are shown in the drawing and are explained in more detail in the following description. In the drawing, the same reference signs designate components or elements that perform the same or analogous functions. In the drawing.

DETAILED DESCRIPTION

Figure 1:
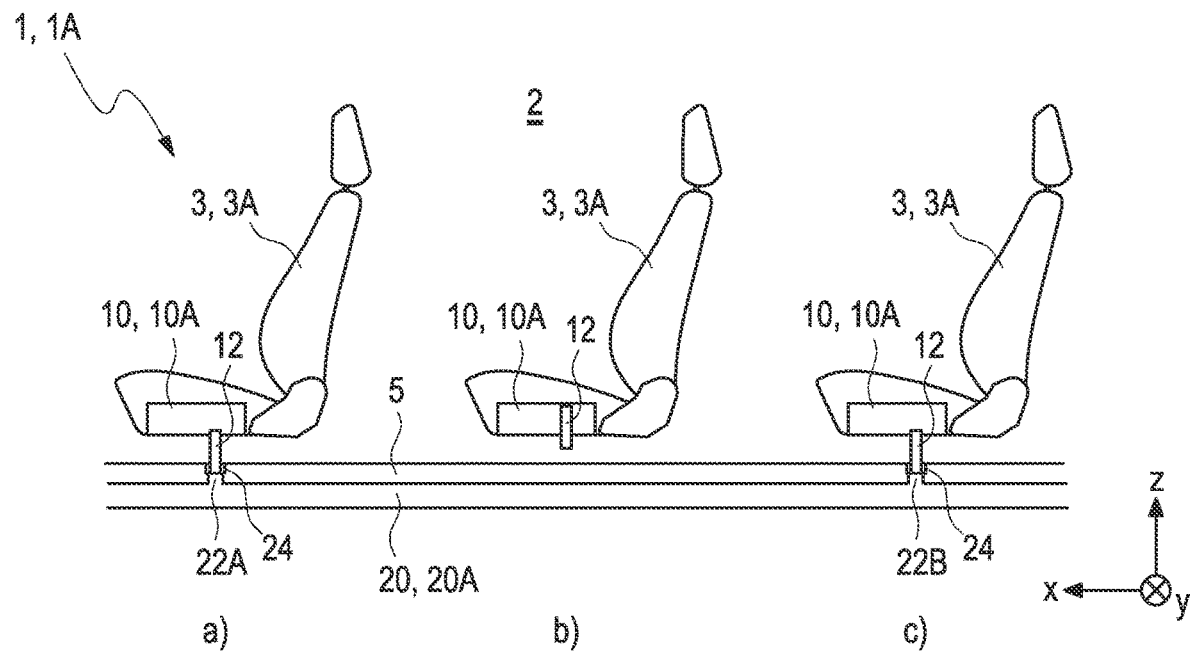
FIG. 1 is a schematic partial view of a vehicle interior with a first embodiment of an air-conditioning arrangement according to an embodiment of the invention for a vehicle.
Figure 2:
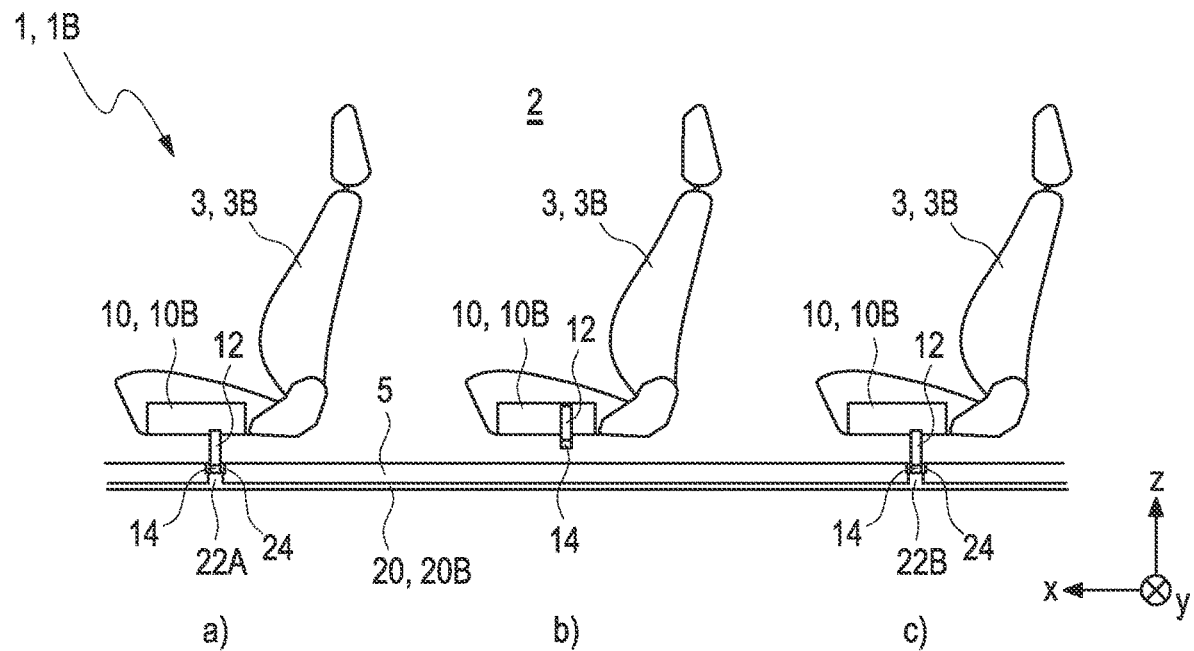
FIG. 2 is a schematic partial view of a vehicle interior with a second embodiment of an air-conditioning arrangement according to an embodiment of the invention for a vehicle.

As can be seen from FIGS. 1 and 2, the air-conditioning arrangement 1, 1A, 1B for a vehicle in the illustrated embodiments each has at least one fluid channel 20, 20A, 20B which has at least two identically designed connection devices 22A, 22B, and at least one movable vehicle seat 3, 3A, 3B. An air-conditioning component 10, 10A, 10B for producing a temperature-controlled airflow that can be output is arranged in the at least one vehicle seat 3, 3A, 3B, wherein the air-conditioning component 10, 10A, 10B of the at least one vehicle seat 3, 3A, 3B can be optionally coupled to and uncoupled from one of the connection devices 22A, 22B of the at least one fluid channel 20, 20A, 20B via a movable fluid connection 12, which, in order to establish a fluid-tight connection, is designed as a counterpart to the connection devices 22A, 22B of the at least one fluid channel 20, 20A, 20B.

The fluid connection 12 is adjustable between a working position in which the fluid connection 12 is inserted into one of the connection devices 22A, 22B and is connected thereto in a fluid-tight manner, and an idle position in which the fluid connection 12 is retracted in the direction of the vehicle seat 3. In FIGS. 1 and 2, the working position of the fluid connection 12 is shown in portions a) and c), respectively. The idle position of the fluid connection 12 is shown in each case in FIGS. 1 and 2 in portion b).

As can also be seen from FIGS. 1 and 2, the illustrated section of the vehicle interior 2 has, for example, a fluid channel 20, 20A, 20B arranged in the underfloor 5 of the vehicle having two connection devices 22A, 22B which are arranged at a distance from one another in the vehicle longitudinal direction x. In addition, FIGS. 1 and 2 each show three vehicle seats 3, 3A, 3A. In this case, a vehicle seat 3, 3A, 3B shown in a first portion a) is arranged at a first position in the vehicle interior 2. The fluid connection 12 of the air-conditioning component 10, 10A, 10B is in the working position thereof and connects the air-conditioning component 10, 10A, 10B to the fluid channel 20, 20A, 20B via the first connection device 22A in a fluid-tight manner. A vehicle seat 3, 3A, 3B shown in a second portion c) is arranged at a second position in the vehicle interior 2. The fluid connection 12 of the air-conditioning component 10, 10A, 10B is also in the working position thereof and connects the air-conditioning component 10, 10A, 10B to the fluid channel 20, 20A, 20B via the second connection device 22B in a fluid-tight manner. A vehicle seat 3, 3A, 3B shown in an intermediate portion b) is arranged between the first and second positions in the vehicle interior 2. This means that the vehicle seat 3, 3A, 3B shown is moved, for example, in guide rails (not shown in detail) between the first and second positions. The air-conditioning component 10, 10A, 10B thereof is therefore separated from the fluid channel 20, 20A, 20B and the fluid connection 12 of the air-conditioning component 10, 10A, 10B is retracted into the idle position thereof.

In the first embodiment of the air-conditioning arrangement 1A for a vehicle shown in FIG. 1, the at least one fluid channel 20 is designed as an air channel 20A, which is connected at one end to a central air conditioner (not shown). The central air conditioner comprises a heating element for heating and drying the airflow and an evaporator for cooling the airflow. In this case, the air-conditioning component 10 is designed as a fan 10A, which sucks in the airflow from the air channel 20A and discharges it via appropriate air vents for the flow and temperature control of the occupant on the vehicle seat 3A.

As can also be seen from FIG. 1, the two connection devices 22A, 22B shown each have a shut-off valve 24 which is open when a fluid connection 12 is inserted and is otherwise closed. This can prevent temperature-controlled air from escaping from the air channel via the connection devices 22A, 22B when the connection devices 22A, 22B are not in use.

In the second embodiment of the air-conditioning arrangement 1B for a vehicle shown in FIG. 2, the at least one fluid channel 20 is designed as a refrigerant line 20B. In this case, the air-conditioning component 10 is designed as an air conditioner 10B. The decentralized air conditioner 10B in the vehicle seat 3B comprises a heating element (not shown) for heating and drying the airflow and an evaporator (not shown) for cooling the airflow and a fan for generating the airflow. In addition, the evaporator of the air conditioner 10B can be connected in a fluid-tight manner to the refrigerant line 20B via the fluid connection 12 and the connection devices 22A, 22B.

As can also be seen from FIG. 2, the two connection devices 22A, 22B shown and the fluid connections 12 shown each have a shut-off valve 14, 24 which are open when the fluid connection 12 is inserted and are otherwise closed. The shut-off valves 24 arranged in the connection devices 22A, 22B can prevent refrigerant from escaping from the refrigerant line 20B via the connection devices 22A, 22B when these are not in use. The shut-off valve 14 arranged in the fluid connection 12 can prevent refrigerant from escaping from the evaporator via the fluid connection 12 when it is not in use.

In the embodiments of the air-conditioning arrangement 1, 1A, 1B shown, the shut-off valves 14, 24 are each designed in such a way that the shut-off valves 14, 24 are automatically opened by inserting the fluid connection 12 into the corresponding connection device 22A, 22B and are automatically locked when the fluid connection 12 is pulled out of the corresponding connection device 22A, 22B. In an alternative embodiment (not shown), the shut-off valves 14, 24 are opened by manual actuation after the fluid connection 12 has been inserted into the corresponding connection device 22A, 22B and locked by manual actuation before the fluid connection 12 is pulled out of the corresponding connection device 22A, 22B.

As can also be seen from FIGS. 1 and 2, in a vehicle according to embodiments of the invention having such an air-conditioning arrangement 1, 1A, 1B, the at least one vehicle seat 3, 3A, 3B is movable in the vehicle longitudinal direction x between at least two positions. In this case, a connection device 22A, 22B of the at least one fluid channel 20 is arranged in each case at the at least two positions, to which the air-conditioning component 10 of the at least one vehicle seat 3, 3A, 3B can be connected in a fluid-tight manner via the fluid connection 12.

LIST OF REFERENCE SIGNS

1, 1A, 1B Air-conditioning device for a vehicle
2 Vehicle interior
3, 3A, 3B Vehicle seat
5 Underfloor
10 Air-conditioning component
10A Fan
10B Air conditioner
12 Fluid connection
14 Shut-off valve
20 Fluid channel
20A Air channel
20B Refrigerant line
22A, 22B Connection device
24 Shut-off valve
a), b), c) Vehicle seat position
x Vehicle longitudinal direction
y Vehicle transverse direction
z Vehicle vertical direction

The invention claimed is:

1. An air-conditioning arrangement for a vehicle, comprising:
   a fluid channel comprising a first connection device and a second connection device, wherein the first and second connection devices are arranged in a vehicle longitudinal direction on the fluid channel; and
   a movable vehicle seat comprising an air-conditioning component configured to discharge a temperature-controlled airflow from the vehicle seat,
   wherein the air-conditioning component comprises a movable fluid connection configured to be removably connected to the first and second connection devices such that fluid communication is established between the air-conditioning component and the fluid channel,
   wherein the fluid connection is configured to move between a working position and an idle position,
   wherein when set at the working position, the fluid connection is inserted into one of the first and second connection devices such that the fluid connection is hermetically connected to the one of the first and second connection devices,
   wherein when set at the idle position, the fluid connection is retracted in a direction toward the vehicle seat such that the fluid connection is spatially separated from the one of the first and second connection devices.

2. The air-conditioning arrangement according to claim 1, wherein the first and second connection devices each include a shut-off valve, and each shut-off valve is configured to be opened when the fluid connection is set at the working position and closed when the fluid connection is moved toward the idle position.

3. The air-conditioning arrangement according to claim 1, wherein the fluid channel is disposed in an underfloor of the vehicle.

4. The air-conditioning arrangement according to claim 1, wherein the fluid channel includes an air channel, and the air-conditioning component includes a fan.

5. The air-conditioning arrangement according to claim 1, wherein the fluid channel includes a refrigerant line, and the air-conditioning component includes an air conditioner.

6. The air-conditioning arrangement according to claim 5, wherein the fluid connection of the air conditioner includes a shut-off valve, and the shut-off valve is configured to be opened when the fluid connection is set in the working position and closed when the fluid connection is set in the idle position.

7. The air-conditioning arrangement according to claim 2, wherein the shut-off valve is configured to be opened automatically by setting the fluid connection in the working position, and the shut-off valve is configured to be closed automatically when the fluid connection is moved toward the idle position.

8. The air-conditioning arrangement according claim 2, wherein the shut-off valve is configured to be opened by manual actuation after the fluid connection has been set in the working position, and the shut-off valve is configured to be closed by manual actuation after the fluid connection is moved toward the idle position.

9. The air-conditioning arrangement according to claim 6, wherein the shut-off valve is configured to be opened automatically by setting the fluid connection in the working position, and the shut-off valve is configured to be closed automatically when the fluid connection is moved toward the idle position.

10. The air-conditioning arrangement according claim 6, wherein the shut-off valve is configured to be opened by manual actuation after the fluid connection has been set in the working position, and the shut-off valve is configured to be closed by manual actuation after the fluid connection is moved toward the idle position.

11. A vehicle comprising:
a fluid channel comprising a first connection device and a second connection device; and
a movable vehicle seat comprising an air-conditioning component configured to discharge a temperature-controlled airflow from the vehicle seat,
wherein the vehicle seat is configured to move in a vehicle longitudinal direction between at least a first seat position and a second seat position,
wherein the air-conditioning component comprises a movable fluid connection configured to be removably connected to the first and second connection devices such that fluid communication is established between the air-conditioning component and the fluid channel,
wherein the fluid connection is configured to move between a working position and an idle position,
wherein when set at the working position, the fluid connection is inserted into one of the first and second connection devices such that the fluid connection is hermetically connected to the one of the first and second connection devices,
wherein when set at the idle position, the fluid connection is retracted in a direction toward the vehicle seat such that the fluid connection is spatially separated from the one of the first and second connection devices,
wherein the first connection device is disposed at the first seat position such that the fluid connection of the air-conditioning component is configured to be removably connected to the first connection device at the first seat position, and
wherein the second connection device is disposed at the second seat position such that the fluid connection of the air-conditioning component is configured to be removably connected to the second connection device at the second seat position,
wherein the first and second connection devices each include a shut-off valve, and each shut-off valve is configured to be opened when the fluid connection is set at the working position and closed when the fluid connection is moved toward the idle position.

* * * * *